United States Patent

[11] 3,592,139

[72] Inventor Pierre Patin
 58, rue de Sevres, 92 Boulogne-sur-Seine, France
[21] Appl. No. 865,037
[22] Filed Oct. 9, 1969
[45] Patented July 13, 1971
[32] Priority Oct. 15, 1968
[33] France
[31] PV 169,984

[54] BELT CONVEYOR
 9 Claims, 12 Drawing Figs.
[52] U.S. Cl. .................................................. 104/25,
 198/16, 198/110, 198/190
[51] Int. Cl. .................................................. A63g 1/00,
 B65g 15/12, B66b 9/12
[50] Field of Search............................................ 198/16,
 129, 190, 110, 26; 104/20, 25

[56] References Cited
 UNITED STATES PATENTS
 1,689,201 10/1928 Halter .......................... 198/190 X

*Primary Examiner*—Edward A. Sroka
*Attorney*—Cameron, Kerkam and Sutton

ABSTRACT: An improvement to the belt conveyor which has a series of sets of belts each being offset transversely so as to comb the adjacent set and the sets being propelled at different speeds and wherein the belts of each set are driven by fixed pulleys on a common shaft and pass over pulleys idly mounted on another common shaft integral with drive pulleys of the following set of belts combing the first set. Said improvement comprises an intermediate endless belt which is arranged between the drivable and freely rotatable pulleys of each set of belts and extends over substantially the width of the conveyor, said intermediate endless belt being grooved to allow the set of belts which pass over it to form a mutually finish surface and being drivable by the superimposed set of belts by frictional contact.

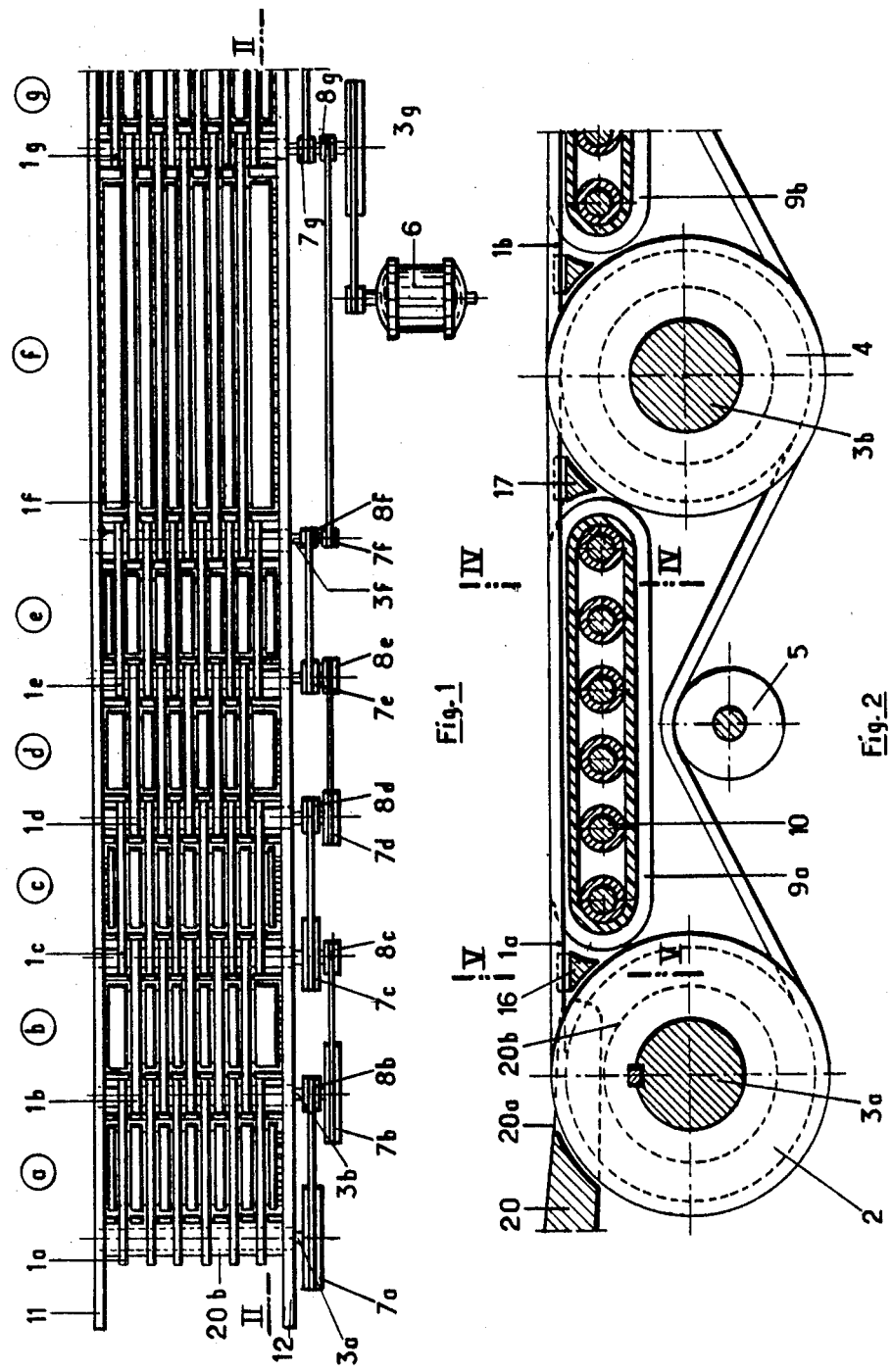

3,592,139

BELT CONVEYOR

This invention relates to conveyor belts particularly but not exclusively, passenger carrying ones of which many kinds are known.

Among such conveyors, those which appear to have the maximum simplicity and safety are belt conveyors which have a series of sets of belts each being offset transversely so as to comb the adjacent set, and the sets being propelled at different speeds, mainly at the beginning and at the end of the run. The belts of each set are driven by fixed pulleys on a common shaft and pass over pulleys idly mounted on another common shaft integral with drive pulleys of the following set of belts combing the first set.

However, because of the width necessary for each belt to resist the load with the least flexure there is a risk that shoes particularly high heeled shoes will jam between belts.

An object of this invention is to reduce this disadvantage.

The present invention consists in a belt conveyor of the type comprising sets of belts transversely interposed so that one set combs the following set wherein the belts of each set are drivable by pulleys fixed on a common shaft and pass over pulleys mounted so as to be free to rotate on another common shaft which is arranged to drive pulleys of the following set of belts combing the first, wherein an intermediate endless belt is arranged between the drivable pulley of each set and the freely rotatable pulley of each set of belts wherein the intermediate belt extends over substantially the whole width of the conveyor wherein the intermediate belt is grooved to allow the set of belts which pass over the intermediate belt to from a mutually finish surface and wherein the intermediate belt is drivable by the super imposed set of belts by frictional contact.

In this manner the continuous surface formed by the upper faces of the belts and of the serrated edge of the endless belt ensures a continuous base for the users' feet without any risk of his shoes jamming.

Preferably two crosspieces of curvilinear triangular shape with a comblike cross section whose serration tops and bottoms disposed slightly below the external and internal faces of the upper sides of the belts are respectively disposed between the endless belt and the motor pulleys and idle of the corresponding series of belts, with the result that any risk of jamming of shoes is eliminated.

The endless belt is advantageously fitted with relatively rigid sheathing, such as a sheathing of a woven material similar to that of tyres or a sheathing made up of a series of small metal bars disposed transversally at a small distance apart and possibly joined to each other by small clamps articulated on them.

In the accompanying drawings:

FIG. 1 is a diagrammatic plan view of a belt conveyor in accordance with the invention, at the beginning of a conveyor run.

FIG. 2 is a partial longitudinal section on an larger scale of FIG. 1 along the line II-II.

Figure 3:
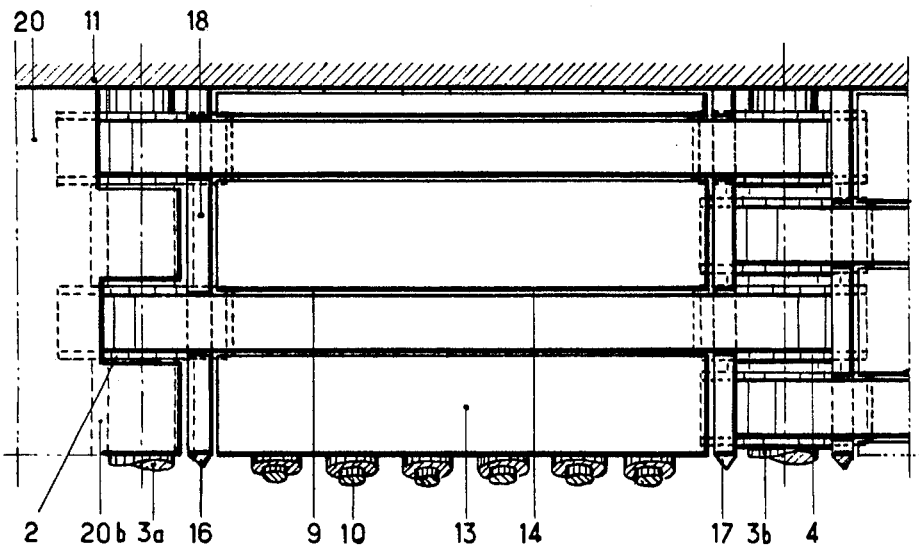
FIG. 3 is a plan view of FIG. 2.
Figure 4:
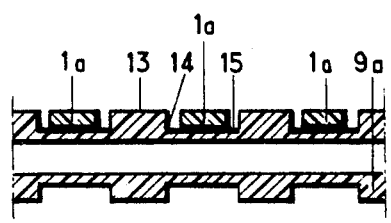
FIG. 4 is a section of FIG. 2 along line IV-IV.

In carrying this invention into effect according to one convenient mode by way of example, FIGS. 1 to 4 show a variable speed belt conveyor which comprises a series of sets belts $a, b, c, d, e, f, g$, the belts $a$ to $g$ being offset transversely from set to set in the usual manner. As is known, the belts of the same set, as illustrated for set $a$ in FIGS. 2, are driven by pulleys 2 fixed on a common shaft $3a$ and pass over pulleys 4 mounted idly on a common shaft $3b$ on which are fixed the drive pulleys of the following series of belts $b$. Each series of belts passes over stretching rollers 5.

An electric motor 6 ensures the drive of all the sets of belts, each shaft 3 bearing a drive pulley $7a$ to $7g$ and a return pulley $8b$ to $8g$. The diameters of the drive pulleys $7a$ to $7g$ decrease in a regular manner in such a way that the displacement speeds of the belts increase while advancing for example from 0.5 meter per second for the belts $a$ to 5 meters per second for the belts $f$, that is to say from 1.8 km. per hour at the start, to permit access of the conveyor to inform people, to a cruising speed of 18 km. per hour. The sets $a, b, c, d$, and $e$ having to attain this latter speed having, preferably, equal spacings between the shafts 3, while when the cruising speed is attained, this spacing can be increased as in the case of the shafts $3f$ and $3g$.

In order to eliminate any risks of the users' shoes jamming, there is disposed between the motor and idle pulleys of each set of belts an endless intermediate belt $9a$ to $9g$ (FIGS. 1 to 4) the width of which is the same as that of the conveyor. Each endless belt $9a$ to $9g$ mounted idly on axles 10 turning freely between the sides 11 and 12 of the conveyor have in transverse section (FIG. 4) a serration the tops 13 of which are on the same level as the external face of the upper side of the corresponding belts 1, the latter ensuring the drive of the endless belt by contact with the bottom 14 of its indentations 15.

Figure 5:
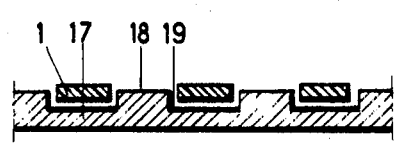
FIG. 5 is a section of FIG. 2 along line V-V.
Figure 6:
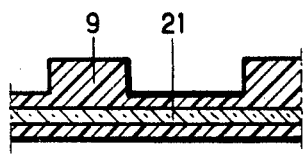
FIG. 6 is a transverse section of the endless belt on a larger scale.
Figure 7:
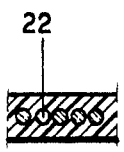
FIGS. 7 and 8 depict two embodiments of the endless belt.
Figure 8:
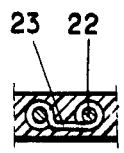

The continuous surface formed by the upper surfaces of the belts 1 and 13 of the serration of the endless belt 9 ensures a continuous base for the users' feet. Two crosspieces 16 and 17 of curvilinear triangular shape, with a comblike cross section whose serration tops 18 and bottoms 19 are disposed slightly below the exterior and interior faces of the upper sides of the belts 1 (FIG. 5), are disposed between the intermediate belt 9 and the motor pulleys 3 and idle pulleys 4 of the corresponding series of belts. Risk of jamming by shoes is thus reduced. An access grille 20 ensures safety at the entrance and exit of the conveyor. This grille has not been depicted in FIG. 1 for the sake of clarity. It comprises a relatively thick serration $20a$ which penetrates intermediate spaces between the pulleys $3a$ above the tubular crosspieces $20b$ filling the intermediate spaces between the pulleys supported by the first and last shaft 3. As illustrated in FIG. 6, the intermediate belt 9 has a sheathing 21 which gives it greater rigidity. This sheathing can be constituted by woven fabric similar to that forming the sheath of tyres. It can also be constituted by a series of small transversal metal bars 22 (FIG. 7) disposed at a small distance apart. These small bars can be joined to each other by clamps (FIG. 8) articulated on them.

Figure 9:
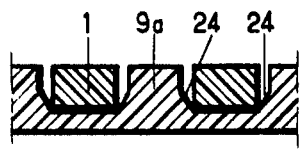
FIG. 9 depicts another embodiment of the endless belt and its drive by the belts.

In the embodiment shown in FIG. 9, the hollows of the serrations of the intermediate belt $9a$ are terminated by two parts 24 inclined inwardly, in such a way that the belt 1 act a little in the manner of trapezoidal belts to drive the endless belt.

Figure 10:
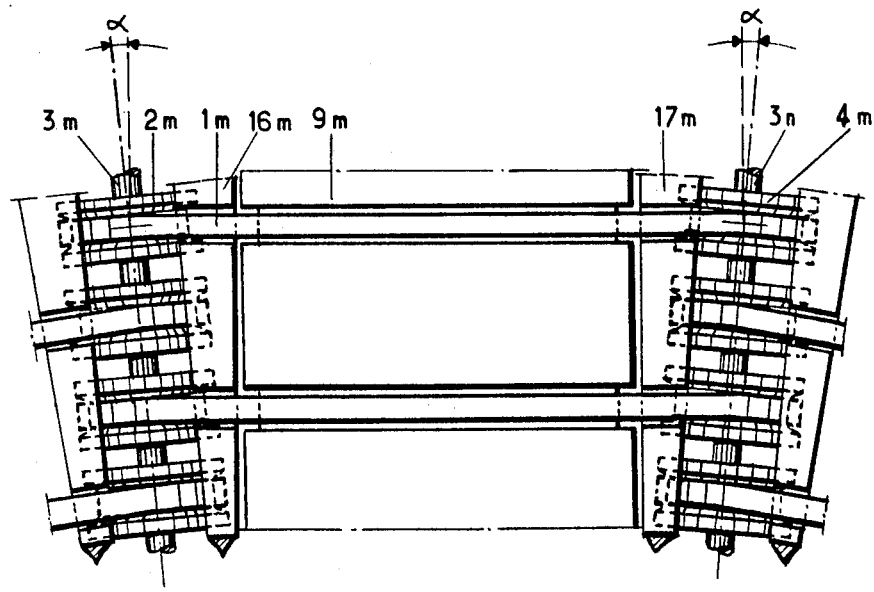
FIG. 10 is a partial diagrammatic plan view of a curved section of the belt conveyor in accordance with the invention.

As illustrated in FIG. 10, with a view to allow the production of curves of a large radius of curvature, there is used a multiplicity of successive elements each one comprising motor pulleys $2m$ and idle pulleys $4n$ respectively supported by common shafts $3m$ and $3n$ making an angle $\alpha$ of low value, preferably less than 6°, between them. The belts $1m$ therefore assume an angle of $\alpha/2$ with respect to the diametral planes of the pulleys $2m$ and $4n$. These pulleys can have decreasing lengths between the exterior belt and the interior belt of the section. They also have the same length, their stretching rollers then being disposed at different levels.

Figure 11:
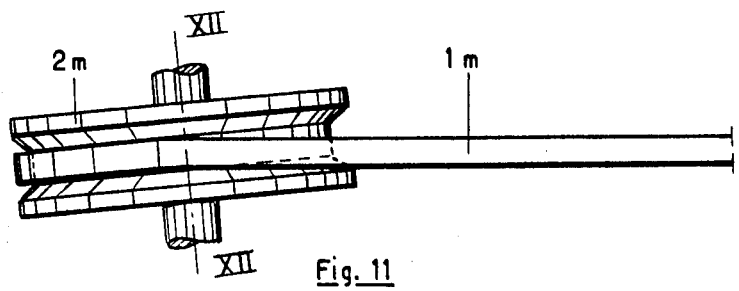
FIG. 11 depicts, on a larger scale, a plan view of one of the pulleys and the corresponding belt of the curved section in FIG. 10.
Figure 12:
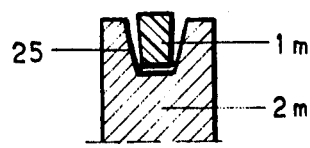
FIG. 12 is a partial section of FIG. 11 along the line XII-XII.

To permit the inclination of the belts with respect to the diametral planes of the pulleys, as illustrated in FIGS. 11 and 12, each belt $1m$ has a slightly trapezoidal profile, the groove of the pulley $2m$ or $4n$, theoretically bounded by a hyperboloidal fraction, is limited by two truncated cones 25 spreading with respect to the belt and tangential to this hyperboloidal fraction.

The corresponding intermediate belt 9m is disposed as in the case of the straight parts with its serrations parallel to the upper inclined edges of the belts, themselves parallel to each other. The crosspieces 16m and 17m have a width decreasing from the exterior to the interior of the curved section.

It is quite evident that without departing from the scope of the invention, modifications can be made to the embodiments described. Of course the final section of the run of the conveyor would be that of FIG. 1 reversed.

What I claim is:

1. A belt conveyor of the type comprising sets of belts transversely interposed so that one set combs the following set wherein the belts of each set are drivable by pulleys fixed on a common shaft and pass over pulleys mounted so as to be free to rotate on another common shaft which is arranged to drive pulleys of the following set of belts combing the first, wherein an intermediate endless belt is arranged between the drivable pulleys of each set and the freely rotatable pulley of each set of belts, wherein the intermediate belt extends over substantially the whole width of the conveyor, wherein the intermediate belt is grooved to allow the set of belts which pass over the intermediate belt to form a mutually finish surface and wherein the intermediate belt is drivable by the super imposed set of belts by frictional contact.

2. A belt conveyor as claimed in claim 1, wherein at a stage on the conveyor each set of belts is arranged to be driven at a faster or slower speed to the following set of belts.

3. A belt conveyor as claimed in claim 1, wherein crosspieces of crenulated cross section are arranged to bridge the gap between the intermediate belt and the drivable and free pulleys of the corresponding sets of belts, and wherein the upper surface of the crenulations are below the upper surface of the sets of belts passing through the crenulations and the lower surface of the crenulations are below the lower surface of said belts.

4. A belt conveyor as claimed in claim 1, wherein the endless belt is provided with a reinforcement.

5. A belt conveyor as claimed in claim 4, wherein the reinforcement is a series of small metal bars disposed transversely at a small distance apart, each bar being linkable to the adjacent bar by links articulating on the bars.

6. A belt conveyor as claimed in claim 1, wherein the bottoms of the grooves of the intermediate belt are inclined inwardly to contact the inner lower part of the edges of the belts.

7. A belt conveyor as claimed in claim 1 wherein at the start and finish of the conveyor there are disposed grilles of a width such that the gaps between the final set of belts is bridged.

8. A belt conveyor as claimed in claim 1, wherein the conveyor is arranged to negotiate a bend, at the bend the conveyor includes a plurality of sections in each one of which the shafts supporting the drivable pulleys and the freely rotatable pulleys make an angle of less than $6_o$ between themselves.

9. A belt conveyor as claimed in claim 8, wherein the belts of the sections on the bend have a slightly trapezoidal profile, and wherein the corresponding grooves of the pulleys being limited by two truncated cones spreading with respect to the corresponding belt.